US008329768B2

(12) United States Patent
Furnary et al.

(10) Patent No.: US 8,329,768 B2
(45) Date of Patent: Dec. 11, 2012

(54) METHOD AND APPARATUS FOR CAPTURING CARBON CONTAINED IN PLASTICS

(76) Inventors: Kevin P. Furnary, Vienna, VA (US); Earl T. Balkum, Mont Vernon, NH (US)

( * ) Notice: Subject to any disclaimer, the term of this patent is extended or adjusted under 35 U.S.C. 154(b) by 375 days.

(21) Appl. No.: 12/549,816

(22) Filed: Aug. 28, 2009

(65) Prior Publication Data

US 2010/0056651 A1  Mar. 4, 2010

Related U.S. Application Data

(60) Provisional application No. 61/136,348, filed on Aug. 29, 2008.

(51) Int. Cl.
*C08J 11/04*  (2006.01)

(52) U.S. Cl. .......... 521/40; 209/3.1; 209/4; 209/20; 209/21; 209/509; 209/606; 209/911; 528/480; 528/502 R; 528/502 C; 528/502 F; 264/37.1; 264/101; 264/911

(58) Field of Classification Search ............ 521/40, 521/40.5, 41, 45.5, 46, 46.5, 47, 47.5, 48, 521/49, 49.8; 264/37.1, 37.29, 101, 102, 264/109, 122, 124, 126, 228, 911; 209/3, 209/3.1, 4, 10, 12.1, 12.2, 19, 18, 20, 21, 209/422, 423, 424, 509, 606, 911; 528/480, 528/501, 502 R, 502 C, 502 F See application file for complete search history.

(56) References Cited

U.S. PATENT DOCUMENTS

| | | | |
|---|---|---|---|
| 4,003,866 A | 1/1977 | Paturle | |
| 4,204,906 A | 5/1980 | Liu | |
| 4,235,707 A | 11/1980 | Burke, Jr. | |
| 5,387,267 A | 2/1995 | Warf et al. | |
| 5,422,051 A | 6/1995 | Sawyers | |
| 6,030,572 A | 2/2000 | Berto | |
| 6,042,340 A | 3/2000 | Melbourne | 417/151 |
| 6,488,766 B2 | 12/2002 | Balkum | 106/745 |

OTHER PUBLICATIONS

Siddique, et al., "Use of recycled plastic in concrete: A review", Waste Management, vol. 28, 2008, pp. 1835-1852.
International Search Report and Written Opinion as issued for PCT/US09/55344, dated Apr. 11, 2011.

*Primary Examiner* — Frances Tischler
(74) *Attorney, Agent, or Firm* — Stites & Harbison PLLC; Marvin Petry

(57) ABSTRACT

A method and apparatus for separating non-biogenic plastic from biogenic waste. A stream of waste materials is delivered through an inlet into a conduit in which the biogenic waste drops out the bottom. The non-biogenic plastic is drawn upwardly by a separator in the form of pressurized gas fed tangentially through two ports in an opposite direction with each other to create a vacuum in the conduit.

5 Claims, 1 Drawing Sheet

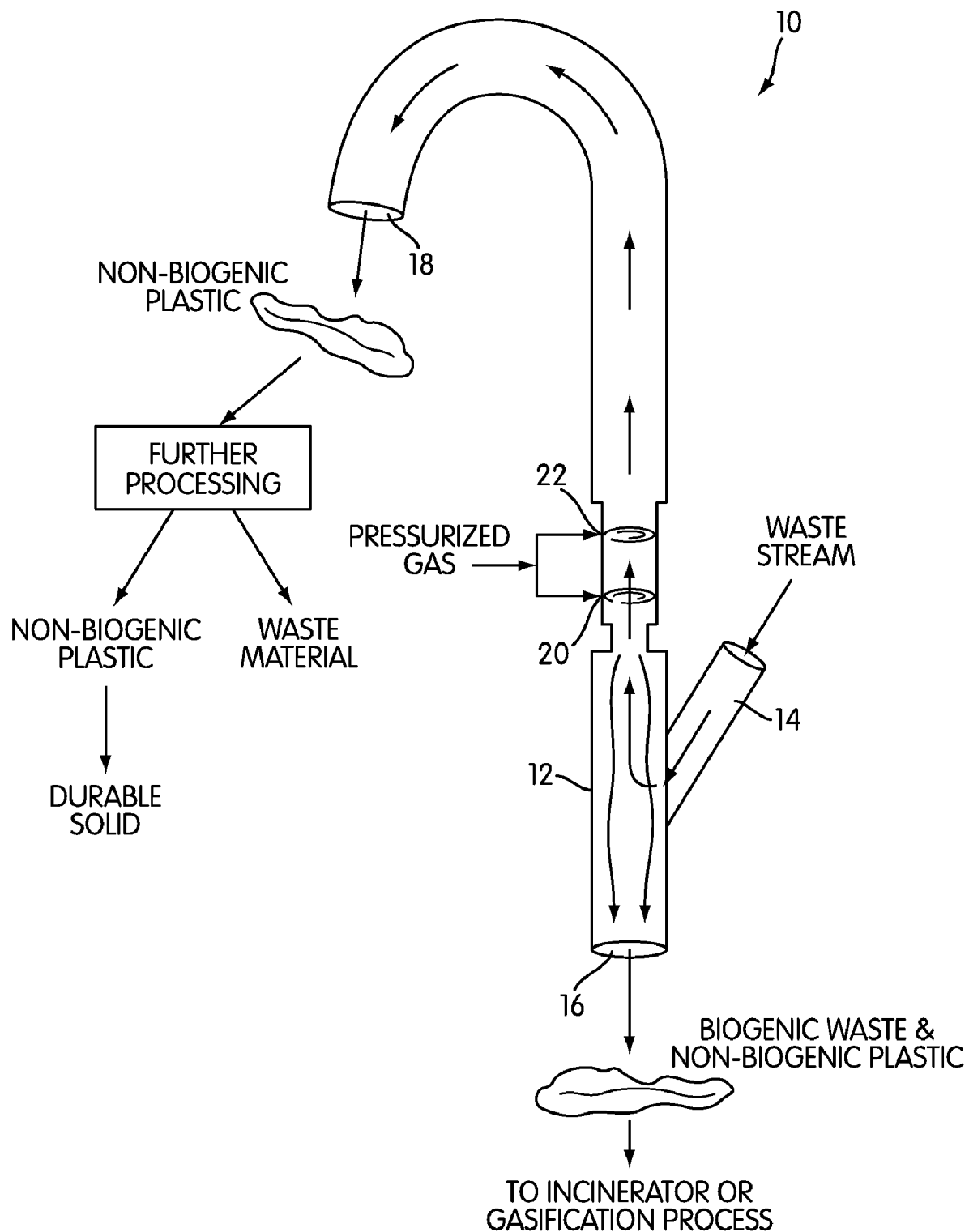

METHOD AND APPARATUS FOR CAPTURING CARBON CONTAINED IN PLASTICS

CROSS-REFERENCE TO RELATED APPLICATIONS

This application claims the benefit of priority from U.S. Provisional Patent Application Ser. No. 61/136,348, filed on Aug. 29, 2008, the content of which is incorporated herein by reference in its entirety.

FIELD

The present invention is generally related to capturing carbon contained in plastics that would otherwise be burned or buried in a landfill. The present invention is also generally related to sequestering the carbon that is captured from plastics into a durable solid.

BACKGROUND

Household solid waste currently ends up in land fills or is burned in an incinerator in what is commonly known as an energy-from-waste (EFW) process. While many municipalities have recycling facilities to capture certain mainstream recyclable plastics, such as polyethylene terephthalate (recycle code 1) and high density polyethylene (HDPE, recycle code 2), other plastics that are not considered to be mainstream recyclable plastics (recycle codes 3-7) end up with the rest of the municipal solid waste. Burning plastics that contain carbon releases carbon dioxide.

It is estimated that plastics comprise 16% of waste discards, yet account for 66% of $CO_2$ emissions from EFW processes. EFW processes currently dispose of about 20% of the waste stream. It is desirable to isolate and sequester post-consumer plastic discards that are currently going to landfills and incinerators, so that $CO_2$ emissions may be reduced, and the carbon contained in the plastics may be used in a durable building material, rather than sit in a landfill.

SUMMARY

In an embodiment of the present invention, there is provided a method for capturing and sequestering carbon contained in plastic. The method includes feeding a waste stream that includes at least non-biogenic plastic and biogenic waste into an apparatus configured to separate the non-biogenic plastic from the biogenic waste. The method also includes feeding a pressurized gas to the apparatus via a first tangential port that is configured to create a first flow of the gas in the apparatus in a first direction and via a second tangential port that is configured to create a second flow of the gas in the apparatus in a second direction that is opposite the first direction so that the first flow and the second flow create a vacuum in the apparatus, and separating the non-biogenic plastic from the biogenic waste by conveying the non-biogenic plastic through the apparatus with the vacuum while dropping the biogenic waste out of the apparatus. The method also includes collecting the separated non-biogenic plastic.

In an embodiment, the method also includes modifying the non-biogenic plastic for use as a modified polymer aggregate.

In an embodiment, the method also includes incorporating the modified polymer aggregate into a mix for formation of concrete.

In an embodiment of the present invention, there is provided a method for sequestering carbon contained in waste plastic. The method includes separating the waste plastic from the waste stream prior to incineration, gasification, landfill, or any other method of final disposal of waste, modifying the plastic for use as a modified polymer aggregate, and using the modified polymer aggregate as a constituent ingredient in a durable building material.

BRIEF DESCRIPTION OF THE DRAWINGS

FIG. 1 illustrates a schematic diagram of an apparatus in accordance with an embodiment of the present invention.

DETAILED DESCRIPTION

FIG. 1 illustrates an apparatus 10 according to an embodiment of the invention. The apparatus 10 generally includes a conduit 12, which may be in the form of a pipe, and an inlet 14 that is configured to allow plastic and other waste materials to enter the apparatus 10. In an embodiment, the material that is fed into the apparatus 10 through the inlet 14 may be reduced in size, i.e. ground down, to a 6" or less particle size via known comminuting methods. In an embodiment, the waste material may be macerated prior to entering the apparatus. In an embodiment, the plastics may be ground after separation curbside, and/or RDF ground (one of the current processes used in WTE plants).

The apparatus also includes a first outlet 16 that is configured to allow biogenic waste and other waste materials that are to be separated from the non-biogenic plastic to drop out of the apparatus via gravity. It is possible for some of the non-biogenic plastic to also drop out of the apparatus via the first outlet 16. A second outlet 18 is configured to allow the non-biogenic plastic that has been separated from the biogenic waste and other waste material to exit the apparatus at a location that is away from the location where the biogenic waste and other waste materials are collected.

Pneumatic pressure energy, which may be in the form of a pressurized gas, such as air, may be tangentially injected through a first tangential nozzle array 20 that is constructed and arranged to direct a first flow of the gas in a first tangential direction (e.g. clockwise) into the conduit 12, and a second tangential nozzle array 22 that is located downstream from the first tangential nozzle array 20 with respect to the direction of flow of the non-biogenic plastic within the conduit 12. The second tangential nozzle array 22 may be constructed and arranged to direct a second flow of the pressurized gas into the conduit in a second tangential direction (e.g., counterclockwise) that is substantially opposite that of the first tangential direction so as to create pneumatic shear within the conduit.

The first and second tangential nozzle arrays may be constructed and arranged to be of the same or substantially the same configuration as the annular chambers and inlet ports of the fluid handling device that is described in U.S. Pat. No. 6,042,340, which is incorporated herein by reference in its entirety. The pressure and flow of the gas being supplied to the pipe via the first and second tangential ports may be controlled so that a vacuum is created within the conduit 12. The vacuum allows the kinetic energy that is supplied via the ports 20, 22 to convey the materials that enter the inlet 14 upward and towards the ports 20, 22. Once the materials are sheared by the counterflows that are provided by the ports 20, 22, the heavier, biogenic waste and some of the non-biogenic plastic that has not fully separated from the waste will drop out of the conduit 12 via the first outlet 16, and the lighter, non-biogenic plastic will be blown out of the conduit 12 via the second outlet 18.

The biogenic waste (and any non-biogenic plastic) that has dropped out of the conduit 12 via the first outlet 16 may be collected and/or conveyed to an incinerator or gasification process so that energy may be generated from the waste. In an embodiment, the material that has dropped out of the conduit 12 via the first outlet 16 may be conveyed back to the inlet 14 so that additional non-biogenic plastic may be recovered, i.e., separated in the apparatus 10 and blown out of the conduit 12 via the second outlet 18.

The non-biogenic plastic that is separated by the apparatus may be further processed so that any dust or other non-plastic material that exited the outlet 18 of the apparatus 10 may be separated from the non-biogenic plastic. Any such dust or other non-plastic material that is separated by further processing may be conveyed to an incinerator or gasification process so that energy may be generated from the waste.

The non-biogenic plastic may then be modified for use as a modified polymer aggregate by the methods described in U.S. Pat. No. 6,488,766, which is incorporated herein by reference in its entirety. The modified polymer aggregate may be used in formation of concrete, thereby sequestering in perpetuity the carbon contained in the plastic.

Embodiments of the invention provide a method to capture and sequester accountable carbon dioxide that is otherwise formed in the thermal processing of carbon-containing waste plastics, a non-biogenic. In an embodiment, the method includes separating the carbon-containing plastic from the municipal solid waste (MSW) stream prior to incineration, gasification, or other thermal method of ultimate disposal of the waste discards. In an embodiment, the method includes separating non-mainstream recyclable curbside "other" plastics from the mainstream recyclable plastics and/or from the MSW stream.

In an embodiment, a method to sequester accountable carbon contained in waste plastics includes separating the plastic from the waste stream prior to incineration, gasification, landfill, or and other method of final disposal of the waste discards; modifying the plastic for use as a modified polymer aggregate by the methods described in U.S. Pat. No. 6,488,766, which is incorporated herein by reference in its entirety, and using the modified polymer aggregate as a constituent ingredient in durable building materials including but not limited to concrete, stucco, plaster, and adobe, thereby sequestering the carbon contained in the plastic in perpetuity.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

What is claimed is:

1. A method for separating non-biogenic plastic and biogenic waste from a waste stream containing both non-biogenic plastic and biogenic waste, and capturing the non-biogenic plastic, comprising the steps of:
   feeding a waste stream containing non-biogenic plastic and biogenic waste through an inlet into a generally vertically oriented conduit,
   at locations in the conduit above the inlet, feeding a pressurized gas into the conduit via a first tangential port that is configured to create a first flow of gas in the conduit in a first direction and via a second tangential port that is configured to create a second flow of gas in the conduit in a second direction that is opposite the first direction so that the first flow and the second flow create a vacuum in the conduit, which allows kinetic energy to convey materials upwardly through the conduit,
   allowing a substantial portion of the biogenic waste to drop by gravity down the conduit and out a first outlet, and by locating the tangential ports at such a distance above the inlet, causing the said vacuum and kinetic energy to draw in the non-biogenic plastic entering the inlet upwardly and convey same up through the conduit to a second outlet.

2. A method according to claim 1, including capturing the separated non-biogenic plastic by collecting same after it comes out said second outlet.

3. A method according to claim 2, including separating out from the non-biogenic plastic coming out of the second outlet dust or other non-plastic materials.

4. A method according to claim 1, including reducing the size of the waste stream prior to entering the inlet to about 6 inches.

5. A method according to claim 1, including macerating the waste stream prior to feeding the waste stream into the inlet.

* * * * *